United States Patent [19]
Otto

[11] Patent Number: 4,466,165
[45] Date of Patent: Aug. 21, 1984

[54] METHOD OF FORMING A BEARING

[75] Inventor: Charles W. Otto, DeKalb, Ill.

[73] Assignee: General Electric Company, Fort Wayne, Ind.

[21] Appl. No.: 377,554

[22] Filed: May 12, 1982

[51] Int. Cl.³ .............................................. B21D 53/10
[52] U.S. Cl. ........................... 29/149.5 PM; 29/90 R; 29/596; 308/241; 308/DIG. 5; 310/90
[58] Field of Search ........ 29/596, 149.5 PM, 149.5 R, 29/90 R; 308/241, DIG. 5; 384/279; 310/90

[56] References Cited
U.S. PATENT DOCUMENTS

| | | |
|---|---|---|
| 2,093,800 | 9/1937 | May . |
| 2,478,856 | 8/1949 | Beaver ........................ 29/149.5 PM |
| 2,845,552 | 7/1958 | Robinson . |
| 2,897,024 | 7/1959 | Chenea .......................... 308/DIG. 5 |
| 2,937,058 | 5/1960 | Boggs . |
| 3,109,684 | 11/1963 | Tupper . |
| 3,166,959 | 1/1965 | Tupper . |
| 3,286,792 | 11/1966 | Wall ............................... 308/DIG. 5 |
| 3,514,168 | 5/1970 | Otto . |
| 4,330,910 | 5/1982 | Schachl et al. ..................... 29/90 R |

FOREIGN PATENT DOCUMENTS 2808919  9/1979  Fed. Rep. of Germany ..... 29/90 R

Primary Examiner—Carl E. Hall
Attorney, Agent, or Firm—Joseph E. Papin

[57] ABSTRACT

A method of forming a bearing having a body of sintered powder metal. The bearing body includes a plurality of surfaces with interstices in the sintered powder metal defining a plurality of lubricant flow capillary paths through the bearing body communicating with the surfaces thereof, respectively. In this method, at least some of the sintered powder metal of at least one of the surfaces on the bearing body is mechanically worked with respect to the capillary paths communicating with the at least one surface, and the capillary paths communicating with the at least one surface are thereby at least restricted to a preselected degree limiting the porosity thereof generally at the at least one surface.

10 Claims, 13 Drawing Figures

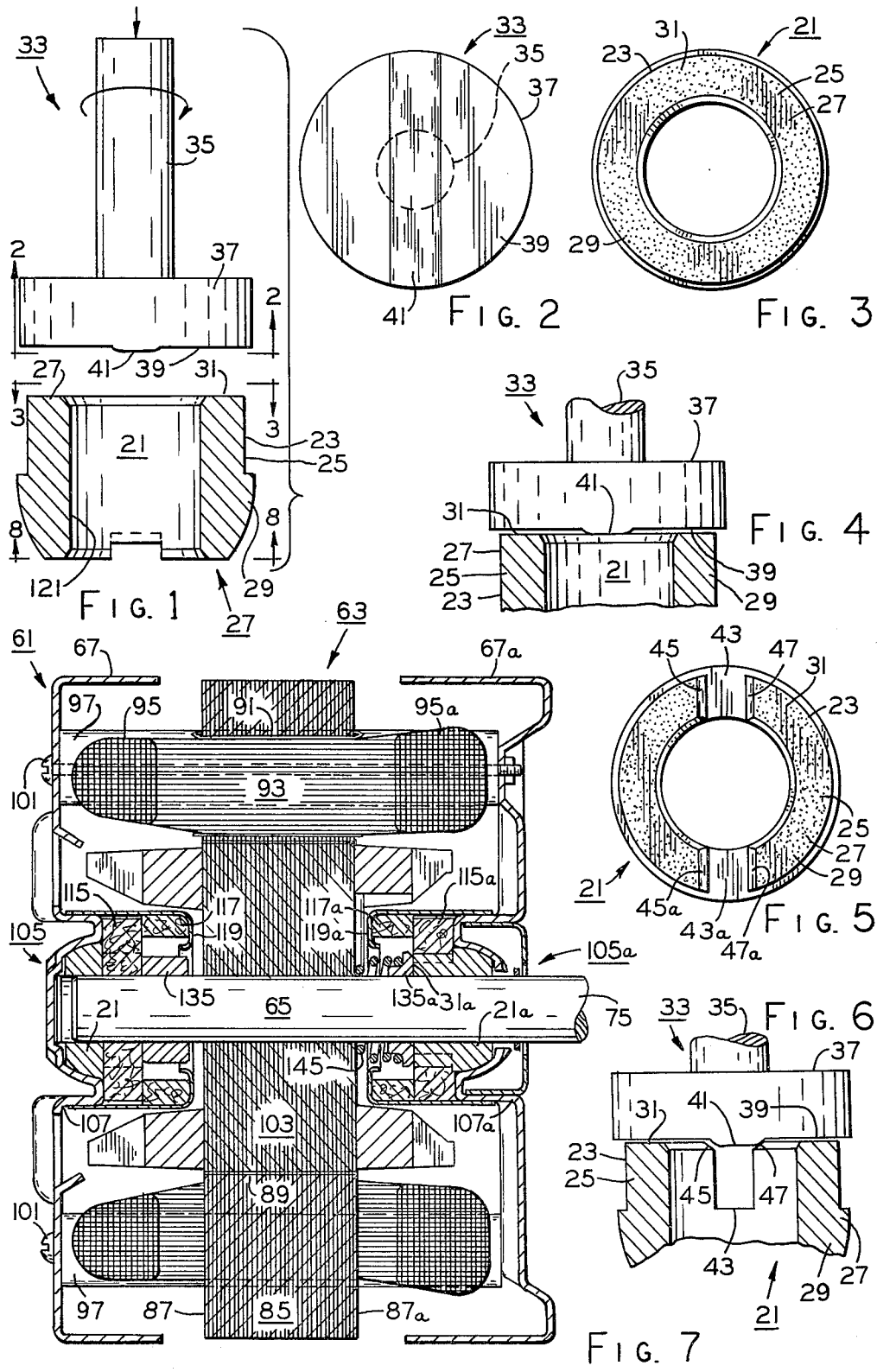

METHOD OF FORMING A BEARING

CROSS-REFERENCE TO RELATED APPLICATION

This application is related to the commonly assigned Charles W. Otto U.S. patent application Ser. No. 377,678 filed May 12, 1982 (now abandoned) concurrently herewith entitled "Dynamoelectric Machine, Rotatable Assembly And Method Of Fabricating" which is incorporated herein by reference.

FIELD OF THE INVENTION

This application relates in general to prime movers and in particular to a dynamoelectric machine, a method of forming a bearing which may be utilized in a dynamoelectric machine.

BACKGROUND OF THE INVENTION

In the past, many different types of bearings were utilized to journal a rotatable assembly of a dynamoelectric machine, and many different schemes where employed to transmit to such bearings a thrust force engendered in response to the rotation of the rotatable assembly when the dynamoelectric machine was energized across a power source.

To avoid the obvious disadvantageous or undesirable feature of the cost involved in employing ball or roller bearings in a dynamoelectric machine, many of the past dynamoelectric machines utilized a sliding type of bearing, such as a generally tubular sleeve bearing or self-aligning bearing for instance, when the duty or application of such past dynamoelectric machines was conducive to the use of such sliding type bearing. However, it is believed that a simple, low cost, dependable and durable sliding type bearing which both journals and takes the thrust of a rotatable assembly in a dynamoelectric machine is difficult to achieve, particularly if the lubricant supply or feed to such sliding type bearing is by lubricant wicking means rather than by a pressurized lubricant source.

In order to overcome the aforementioned disadvantageous or undesirable feature involving wick feeding of lubricant to the past sliding type bearing, many of such sliding type bearings were formed of a compressed powder material, such as a sintered powder metal or the like for instance. Of course, the sintered powder metal of these past sliding type bearings was somewhat porous having interstices therein generally defining capillary lubricant flow passages or capillary paths through such bearings communicating with all of the surfaces thereof. Thus, with respect to lightly loaded surfaces or interfaces of the past sintered powder metal bearing, such as a bore or journaling surface thereof for instance, lubricant exuded or flowed from the capillary paths in such bearing so as to lubricate such lightly loaded surface or interface. Further, it the porosity of the past sintered powder metal bearing was considerable, lubricant may have been stored therein. However, it is believed the sintered powder metal bearing has a serious disadvantageous or undesirable feature when a surface thereof is subjected to high loading forces. For instance, while the capillary paths permitted the egress therefrom of lubricant, as discussed above, lubricant also ingressed into the capillary paths; therefore, when a surface of the sintered powder metal bearing was highly loaded, i.e., in thrust transfer engagement with a thrust collar or the like for instance, any lubricant on such highly loaded surface may have been forced therefrom into the capillary paths communicating with such surface due to the thrust transfer engagement thereby to obviate the possibility of establishing at least a partial hydrodynamic film of lubricant between the highly loaded surface and the thrust collar.

In some of the past sintered powder metal sliding type bearings, the surfaces thereof subjected to high load were treated in order to completely close the capillary paths communicating with such highly loaded surfaces. For instance, it is well known to the art to infiltrate these high load surfaces with a fluid, such as a liquid resin or a molten metal or the like, with such fluid penetrating and solidifying in the capillary paths of the bearing communicating with such high load surfaces thereby to completely close such capillary paths and obviate lubricant ingress and egress therethrough. With the capillary paths closed, as discussed above, it is, of course, then possible to establish a hydrodynamic film of lubricant between the high load surface and the aforementioned thrust collar associated in thrust transfer relation therewith. However, one of the disadvantageous or undesirable features of this above discussed fluid method of closing capillary paths to the highly loaded surface is believed to be that such method may have been somewhat slow and laborious thereby increasing production costs. Another disadvantageous or undesirable feature of this above discussed method is believed to be that the application of the liquid resin or molten metal to the high load surface of the bearing may have been rather messy in a production area and may have involved hazardous working conditions in such production area.

SUMMARY OF THE INVENTION

Among the several objects of the present invention may be noted the provision of an improved method of forming a bearing which overcome the above discussed disadvantageous or undesirable features, as well as others, of the prior art; the provision of such improved method utilizing a sliding type bearing formed of compressed powder material having capillary paths defined therein through which lubricant flow may be predeterminately regulated to accommodate a preselected load application on the sliding type bearing; the provision of such improved method in which at least one load surface of the sliding type bearing is mechanically worked to predeterminately at least restrict at least some of the capillary paths communicating with such at least one load surface thereby to achieve the predetermined regulation of the lubricant flow therethrough; the provision of such improved method in which other capillary paths communicating with at least one depression in the at least one load surface is also mechanically worked to predeterminately at least restrict at least some of such other capillary paths thereby to achieve the predetermined regulation of the lubricant flow therethrough; and the provision of such improved method utilizing components which are simplistic in design, economically manufactured and easily assembled. These as well as other objects and advantageous features of the present invention will be in part apparent and in part pointed out hereinafter.

In general, a method is provided in one form of the invention for forming a bearing having a body of at least sintered powder metal. The bearing body includes a plurality of surfaces and with interstices in the sintered powder metal defining a plurality of capillary flow path means for lubricant flow extending through the bearing body and communicating with the surface thereof, respectively, and at least one of the surfaces is a generally annular planar surface having at least one depression therein with the at least one depression extending generally radially across the generally annular planar surface. A tool means is used having a face with a rib of a hardened material extending therefrom. In practicing this method, the generally annular planar surface of the bearing body and the face of the tool means are placed in juxtaposition, and the rib of the tool means is overlaid with a part of the generally annual planar surface. At least one of the bearing body and the tool means is rotated, and at least one of the tool means face and the generally annular planar surface is moved toward the other thereof. The rib on the tool means face is rubbed with the generally annular planar surface generally as the at least one of the bearing body and the tool means is rotated, and the tool means rib is entered into the at least one depression to effect the rubbing of at least a part of the at least one depression in the generally annular planar surface at least some of the sintered powder metal on the generally annular planar surface and in the at least part of the at least one depression is displaced in response to the rubbing thereof with the rib of the tool means, and thereby the size of at least some of the capillary flow path means communicating with the generally annular planar surface and the at least part of the at least one depression therein is at least reduced.

BRIEF DESCRIPTION OF THE DRAWINGS

FIG. 1 is a partial sectional view showing a tool disposed for working engagement with a bearing and illustrating principles which may be practiced in a method of forming a bearing;

FIGS. 2 and 3 are elevational views taken along lines 2—2 and 3—3 of FIG. 1, respectively;

FIG. 4 is a partial sectional view of the bearing and tool of FIG. 1 showing a rib of the tool in rubbing engagement with a thrust taking surface of the bearing;

FIG. 5 is an elevational view illustrating the thrust surface of the bearing of FIG. 1 having opposite notches and chamfers therein;

FIG. 6 is another partial view of the tool of FIG. 1 showing its rib in rubbing engagement with a chamfer adjacent the notch in the thrust taking surface of the bearing of FIG. 5 thereby to illustrate principles which may be practiced in a method of forming a bearing in one form of the invention;

FIG. 7 is a sectional view showing a dynamoelectric machine;

Corresponding reference characters indicate corresponding parts throughout the several views of the drawings.

Figure 8:
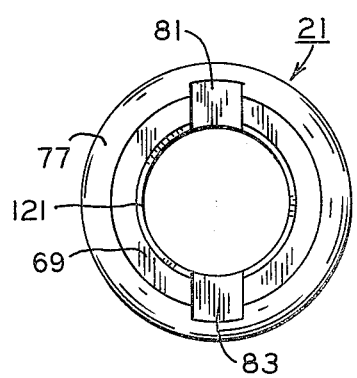
FIG. 8 is an elevational view taken along line 8—8 of FIG. 1.

The exemplifications set out herein illustrate the preferred embodiments of the invention in one form thereof, and such exemplifications are not to be construed as limiting the scope of the invention in any manner.

DETAILED DESCRIPTION OF THE PREFERRED EMBODIMENTS

With reference to the drawings in general, there is illustrated in one form of the invention a method of forming a bearing 21 having a body 23 of compressed powder material 25 (FIGS. 1-6). Beariing body 23 includes a plurality of surfaces, indicated generally at 27, and compressed powder material 25 of the bearing body has a matrix or plurality of interstices defining a plurality of capillary paths or passage means 29 for lubricant flow extending through the bearing body so as to communicate or otherwise intersect with the surfaces of the bearing body, respectively (FIGS. 1 and 6). In this method, at least some of compressed powder material 25 of at least one of surfaces 27, such as a generally annular and generally planar thrust or thrust taking surface 31 or the like for instance, is mechanically worked to predeterminately at least restrict at least some of capillary passage means 29 communicating with the thrust taking surface (FIGS. 4 and 6). Due to the aforementioned at least restriction of at least some of capillary passage means 29 communicating with thrust taking surface 31 of bearing body 23, lubricant flow rate is predeterminately regulated or otherwise controlled through the capillary passage means communicating with the thrust taking surface of the bearing body.

More particularly and with specific reference to FIGS. 1-6, it is believed that a number of various different sliding type bearings, such as a sleeve bearing or a self-aligning bearing 21 or the like for instance, have been manufactured or otherwise formed by various different powder metallurgy processes. For example, one such process is in the M. D. Tupper U.S. Pat. No. 3,109,684 issued Nov. 5, 1963 and U.S. Pat. No. 3,166,959 issued Jan. 26, 1965, and each of these patents is incorporated herein by reference. Compressed powder material 25 comprises a mixture of a metallic powder, such as powdered iron or the like for instance, which is substantially free of impurities, and a filler, such as graphite or the like for instance. In the preferred embodiment, the mixture contains a minimum of generally about ninety-six percent (96%) powdered iron with generally between about two to three percent (2%-3%) graphite. While compressed powder material 25 and mixtures thereof were utilized in the preferred embodiment, it is contemplated that other mixtures of other metals, metal alloys and other fillers, as well as various different percentages of such other mixtures, may be employed to form bearings within the scope of the invention so as to meet at least some of the objects thereof.

Briefly discussing an exemplary method of molding a bearing, the mixture of the powder material may be placed in a mold cavity having a desired bearing configuration, such as that of bearing body 23 or the like for instance, of a conventional powder metal molding press where the material may be pressed or otherwise compacted into a semifinished or so-called "green" powder bearing. This semifinished compacted bearing may then be placed into a standard sintering oven and sintered or fired whereupon the fired material becomes a unitary substantially rigid body. If desired or if necessary, the fired bearing may be subsequently subjected to various different sizing operations, such as for example additional compaction in a sizing mold or the like. While the exemplary method briefly discussed above may be employed to mold bearing 21, it is contemplated that other different methods having different steps may be employed to effect the formation of the bearing within the scope of the invention so as to meet at least some of the objects thereof. Regardless of the method used to mold bearing 21, it is believed that it is not possible to control the requisite predetermined permeability or regulation of the interconnecting size of the capillary paths of the bearing in the preferred embodiment by controlling the compacting of the compressed powder material of the bearing during the formation thereof. Therefore, in order to predetermine the degree of lubrication or permeability at thrust taking surface 31 of bearing 21, the bearing must be further processed to at least restrict the size of at least some of capillary passages 29 communicating with the thrust taking surface of the bearing.

In order to effect regulation of the permeability of bearing 21 through capillary passages 29 of bearing body 23 to at least thrust taking surface 31 thereof, the bearing body is located or otherwise positioned or disposed in a fixture (not shown) with the thrust taking surface arranged so as to be mechanically worked, as illustrated in FIG. 1. A tool or tool means, indicated generally at 33 includes a stem or chucking portion 35 adapted to be secured for rotation in suitable equipment means, such as a rotatable and vertically movable arbor or the like for instance (not shown), and a generally circular head 37 having a generally planar face 39 is integrally formed with the stem of the tool, FIG. 2. Means, such as a rib 41 of a hardened material or the like for instance, is secured or otherwise mounted in face 39 of tool 33 for rubbing or mechanically working thrust taking surface 31 of bearing body 23. The length of tool rib 41 is preselected so as to extend at least generally radially across the radial extent of generally annular thrust taking surface 31, and the tool rib has a generally cylindric or semicircular configuration or cross section between its opposite ends; however, while tool face 39 and tool rib 41 are illustrated and discussed herein as having a specific configuration for purposes of disclosure, it is contemplated that other tool faces and tool ribs having other configurations and lengths may be utilized within the scope of the invention so as to meet at least some of the objects thereof. Furthermore, while rubbing tool 33 is illustrated herein for purposes of disclosure, it is contemplated that other tools, such as for instance a roller burnishing tool or the like, may be utilized to effect mechanical working of bearing body 23 in one form of the invention so as to meet at least some of the objects thereof. With bearing body 23 located in its fixture (not shown) and tool 33 arranged so as to be rotatable with respect to the bearing body, the tool is moved downwardly (as best seen in FIG. 4) so as to rotatably engage rib 41 thereon in working engagement with thrust taking surface 31 of the bearing body. With tool 33 being rotated at a preselected speed and having a preselected force applied thereto to effect the rotating engagement of tool rib 41 with thrust taking surface 31 of bearing body 23, at least some of sintered powder metal 25 at the thrust taking surface is mechanically worked or otherwise deformed or displaced with respect to at least some of capillary passages 29 of bearing body 23 communicating with the thrust taking surface thereof. In other words, tool rib 41 is rubbed against thrust taking surface 31 of bearing body 23 so as to, in effect, smear or wipe sintered powder metal 25 on the thrust taking surface to a preselected degree or amount which effects at least a restriction or reduction in size of at least some of capillary passages 29 at least generally at the juncture thereof with the thrust taking surface. Of course, in practicing this method, the parameters involved in predetermining the permeability of thrust taking surface 31, i.e., predetermining the restriction of capillary passages 33 are: the force of the rubbing engagement; tool speed and number of rotations thereof during the rubbing engagement; and the general size of the capillary passages created during the above discussed molding of the bearing. Thus, by predetermining the force of the rubbing engagement between tool rib 41 and thrust taking surface 31 of bearing body 23, the rotational speed of tool 33, and the number of rotations thereof, the restriction or reduction in size of capillary passages 29 communicating with the thrust surface may be regulated so as to control or otherwise predetermine the permeability of bearing 21 at its thrust taking surface, i.e., to generally predetermine lubricant flow rate through the capillary passages communicating with the thrust taking surface in accordance with the particular application of the dynamoelectric machine in which bearing 21 may be utilized. Furthermore, the above discussed mechanical working of thrust taking surface 31 of bearing body 23 may, if desired, be carried out to a degree wherein deformed sintered powder metal 25 is smeared over or otherwise deposited in capillary passages 29 intersecting with the thrust taking surface so as to close or seal such capillary passages. The degree to which capillary passages 29 are predeterminately restricted or closed, as discussed above, depend upon which of the three known types of lubrication is desired at thrust taking surface 31, i.e. boundary lubrication, a hydrodynamic layer lubrication, or partial hydrodynamic lubrication; and, such lubrication types depend, of course, upon the particular load to which such thrust taking surface may be predictably subjected in any given dynamoelectric machine application. In some instance after tool 33 has been rotated in one direction, say for instance the clockwise direction, in rubbing engagement with thrust taking surface 31 of bearing body 23, it may be desirable to reverse the rotation of the tool so as to also effect the rubbing of the thrust taking surface in the clockwise direction. While the mechanical working of thrust taking surface 31 of bearing body 23 is discussed above within the context of rotating only tool 33, it is contemplated that only the bearing body may be rotated moving the thrust taking surface into rubbing engagement with rib 41 on a stationary tool and also that both the tool and the bearing body may be rotated with either being moved to effect the rubbing engagement within the scope of the invention so as to meet at least some of the objects thereof. Further, while only one tool rib 41 is shown and described hereinabove on tool 33, it is contemplated that a tool having a plurality of such ribs spaced angularly thereabout may be utilized within the scope of the invention so as to meet at least some of the objects thereof.

While bearing 21 has been discussed hereinabove within the context of thrust taking surface 31 having a generally annular and planar configuration, it may be noted that the thrust taking surface may be provided with at least one means, such as notch or slot 43 or the like for instance, for receiving a part of a feeder wick device, as discussed in greater detail hereinafter, and a pair of indentations or depressions such as bevels, ramps or chamfers 45, 47 or the like for instance, are provided in the thrust taking surface adjacent opposite sides of notch 43 therein. Chamfers 45, 47 are predeterminately disposed so as to extend generally radially completely across the radial extent of generally annular thrust taking surface 31 and also to extend a predetermined depth into the thrust taking surface. Of course, with chamfers 45, 47 provided in thrust taking surface 31, it is also desirable to associate tool rib 41 in rubbing engagement with the chamfers to at least restrict capillary passages 29 intersecting with the chamfers. In order to effect the rubbing of chamfers 45, 47 rib 41 of tool 33 is moved downwardly into notch 43 in rubbing engagement with chamfer 45 generally as the tool rib is rotated about thrust taking surface 31 in the rubbing engagement therewith, as shown in FIG. 6. Thus, due to the downward movement of tool 33, it may be noted that the rib 41 extends or is spaced from face 39 of the tool a distance greater than the aforementioned predetermined depth of chamfers 45, 47 to obviate interfering engagement between the tool face and the thrust taking surface when the tool rib is so translated from its rubbing engagement with the thrust taking surface to its rubbing engagement with chamfers 45, 47. After tool rib 41 is rubbed across chamfer 45, continued rotation of tool 33 translates or rotates the tool rib across notch 43 into rubbing engagement with chamfer 47 and thereacross back into rubbing engagement with the thrust taking surface. Of course, tool 33 may be programmed by suitable means to enter into notch 43 no more than generally about the predetermined depth of chamfers 45, 47. In this manner, upon each rotation of tool rib 41 in rubbing engagement about thrust taking surface 31, chamfers 45, 47 are also rubbed to effect at least restriction of at least some capillary passages 29 intersecting therewith. Although only notch 45 and its chamfers 45, 47 are discussed with respect to bearing 21, it is contemplated that additional notches and associated chamfers may be employed in the bearing and rubbed to at least restrict capillary passages intersecting therewith within the scope of the invention so as to meet at least some of the objects thereof.

Figure 9:
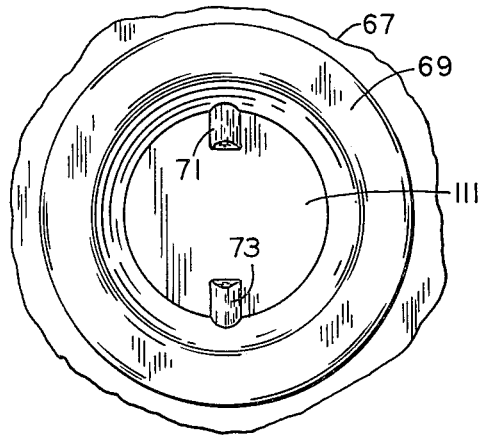
FIG. 9 is a partial sectional view taken along line 9—9 of FIG. 7.
Figure 10:
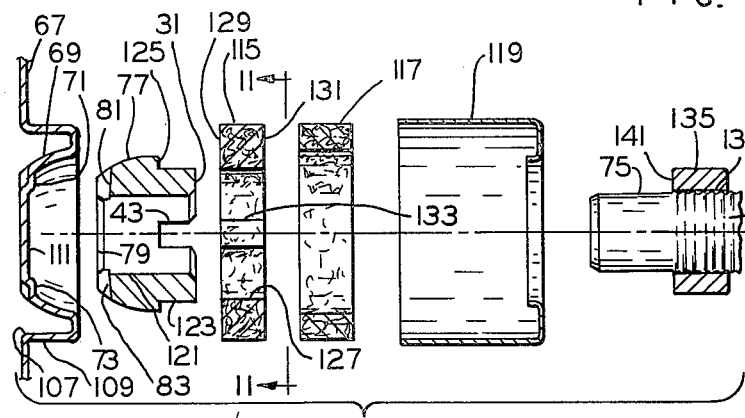
FIG. 10 is an exploded view of some of the components of the dynamoelectric machine of FIG. 7.
Figure 11:
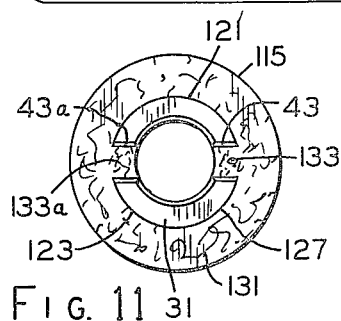
FIG. 11 is a partial sectional view taken along line 11—11 of FIG. 10.
Figure 13:
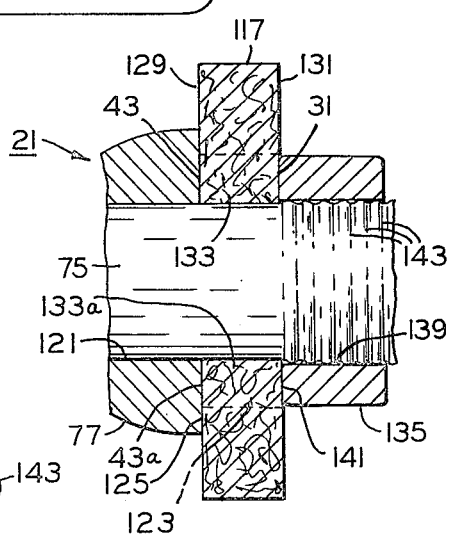
FIG. 13 is a sectional view taken along line 13—13 of FIG. 12.
Figure 12:
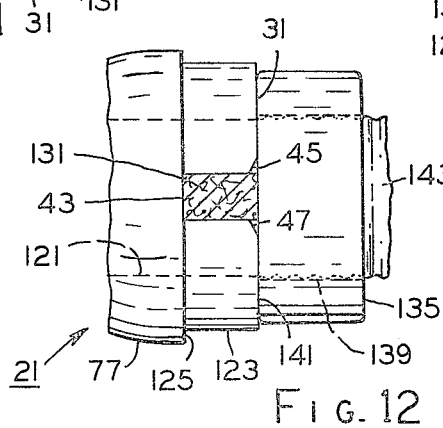
FIG. 12 is a greatly enlarged, partial view taken from FIG. 7 with the feeder wick partially broken away to illustrate the establishment of lubrication between the bearing thrust surface and the thrust device.

With reference again in general to the drawings and recapitulating in part with respect to the foregoing, a dynamoelectric machine 61 has a stationary assembly 63 and a rotatable assembly 65 (FIG. 7). An end shield 67 is mounted in association with stationary assembly 63 and includes a partial spherical seating surface 69 formed integrally therewith, and a pair of keys or lands 71, 73 are also integrally formed on the end shield extending generally radially so as to intersect with the seating surface (FIG. 9). Bearing or bearing means 21 arranged for journaling a part, such as a shaft 75 for instance, of rotatable assembly 65 includes a partial spherical bearing surface 77 peripherally arranged about the bearing between a pair of opposite ends thereof, such as thrust taking surface 31 and a locking surface 79, and the bearing surface is disposed in engagement with seating surface 69 on end shield 67 (FIGS. 7 and 10). A pair of keyways or grooves 81, 83 recessed into locking end 77 of bearing 21 extend generally radially to intersect with bearing surface, respectively, and the keyway pair receive therein key pair 71, 73 so as to retain the bearing surface generally against rotational displacement with respect to the engagement thereof with seating surface 69 (FIGS. 8-10).

More particularly and with specific reference to FIG. 7, stationary assembly 63 comprises a ferromagnetic core or stator 85 having a pair of generally opposite ends or end faces 87, 87a which are respectively intersected by a bore 89 extending generally axially through the stator. A plurality of generally radially disposed winding means accommodating slots 91 are also provided in stator 85 respectively intersecting with both stator bore 89 and stator end faces 87, 87a. Winding means 93, such as a plurality of conductor turns or coils thereof, is disposed in slot plurality 91 having suitable insulation therebetween, and the winding means has a pair of opposite, generally annular groupings of end turns 95, 95a thereof disposed generally about stator bore 89 adjacent stator end faces 87, 87a, respectively. A plurality of beams or the like, such as shown at 97 for instance, are associated or otherwise fixedly secured to stator 85 generally adjacent its outer peripheral portion, and the opposite ends of the beams are abutted against a pair of structural components, such as end shields 67, 67a or the like for instance, thereby to predeterminately space the end shields from stator end faces 87, 87a, respectively. If a more detailed discussion of the securement of beams 97 to stator 85 is desired, reference may be had to U.S. Pat. No. 3,858,067 issued Dec. 31, 1974 to Charles W. Otto and which is incorporated herein by reference. In order to retain end shields 67, 67a in abutment with the opposite ends of beams 97, a plurality of through bolt assemblies 101 extend through the beams and are interconnected with the end shields, respectively. Although stationary assembly 65 is illustrated herein as having a particular construction, it is contemplated that other stationary assemblies having various other constructions may be utilized in dynamoelectric machine 61.

Rotatable assembly 65 comprises a ferromagnetic core or rotor 103 which may, if desired, be of the squirrel-cage type, and the rotor is mounted on shaft 75 so as to be conjointly rotatable therewith. Rotor 103 is rotatably disposed within bore 89 of stator 85 so as to be arranged in magnetic coupling relation with winding means 93 of the stator upon the excitation of the winding means when dynamoelectric machine 61 is selectively energized across a power source (not shown). Opposite end portions of rotor shaft 75 are associated with a pair of lubrication and bearing systems 105, 105a which are supported on end shields 67, 67a, respectively; and since end shields 67, 67a and the components of lubrication and bearing systems 105, 105a are generally the same, only end shield 67 and lubrication and bearing system 105 will be discussed hereinafter in detail although corresponding components of end shield 67a and system 105a will be designated by the letter "a".

End shield 67 is formed or otherwise stamped or punched from a sheet metal material, such as a sheet steel or the like for instance. A generally central hub or recess portion 107 of end shield 67 is integrally deformed therefrom. Recess portion 107 has a generally cyclindric axially extending sidewall 109, and a base wall 111 of the recess portion is integral with the sidewall. A generally central part of base wall 111 defines partial spherical bearing seat or seating surface 69 which at least in part is generally axially coextensive with sidewall 109 being spaced radially inwardly therefrom. Keys 81, 83 are also integrally deformed from base wall 111 so as to extend or protrude past or from partial spherical seating surface 69 of the base wall, and the keys are oppositely spaced apart so as to extend generally radially with respect to each other.

Lubrication and bearing system 105 comprises bearing 21, a lubricant feeder wick device 115, a lubricant storage wicking material 117 and means, such as a cover or containers 119 or the like for instance, for containing at least the lubricant storage wicking material. A shaft receiving or journaling bore 121 extends generally axially through bearing body 23 intersecting with opposite thrust taking surface 31 and locking surface 79 thereof, and partial sherical bearing surface 77 extends peripherally about the bearing body intersecting with the locking surface. A generally cylindric surface 123, which also extends peripherally about bearing body 23, has one end intersecting with thrust taking surface 31, and a generally radially extending shoulder 125 on the bearing body is interposed between the other end of the cylindric surface and partial spherical bearing surface 77. Thus, opposite notches 43, 43a in bearing body 23 intersect with bore 121 and cylindric surface 123 thereof as well as with thrust taking surface 37, and chamfers 45, 47 and 45a, 47a interposed between notches 43, 43a and thrust taking surface 31 also intersect with the bore and the cylindric surface of the bearing body. It may be noted that keyways 81, 83 are provided in locking surface 79 of bearing body 23 extending generally radially and oppositely so as to intersect between partial spherical bearing surface 77 and bore 121 of the bearing body. Therefore, when partial spherical bearing surface 77 of bearing 21 is engaged with partial spherical seating surface 69 of end shield 67, it may also be noted that keys 71, 73 integral with the end shield are received in antirotational yet self-adjusting engagement within keyways 81, 83 provided therefor in the bearing thereby to obviate rotational movement of partial spherical bearing surface 77 of the bearing in its seating engagement with the partial spherical seating surface of the end shield, as discussed hereinafter. Although the engagement of keys 71, 73 and keyways 81, 83 obviate rotation of bearing 21, as discussed above, such engagement of the keys and keyways does permit at least a limited amount of self-adjusting movement of partial spherical bearing surface 77 of bearing 21 on partial spherical seating surface 69 of end shield 67. While a pair of interlocking keys 71, 73 and keyways 81, 83 are illustrated herein, it is contemplated that a greater or lesser number thereof may employed in antirotational yet self-adjusting engagement. While bearing surface 77 of bearing 21 is disclosed as being a partial spherical surface, it is contemplated that other bearing surfaces, such as for instance a partial toroidal surface or the like, may be utilized on the bearing.

Feeder wick 115 is generally annular in shape having an opening 127 extending axially therethrough between a pair of opposite faces 129, 131, and a pair of opposite wiping fingers or extensions 133, 133a on the feeder wick extend generally radially between the opposite faces thereof into opening 125. Feeder wick 115 may be formed of a suitable composition or material, such as felt or the like for instance. When feeder wick 115 is assembled with bearing 21, opening 127 is disposed about cylindric surface 123 of bearing body 23, and wiping fingers 131, 131a of the feeder wick are positioned in notches 43, 43a of the bearing body protruding slightly into bore 121 thereof. Feeder wick 115 is dimensioned so that when face 129 thereof is seated against shoulder 125 of bearing body 23, opposite face 131 of the feeder wick extends slightly past thrust taking surface 31 of the bearing body. Thus, it may be noted that wiping fingers 133, 133a extend beyond thrust taking surface 31 and bore 121 of bearing body 23 for lubricant wiping engagement with shaft 75 and a pair of thrust devices 135, 135a associated therewith, as discussed in greater detail hereinafter. Generally annular container or open-ended cup-shaped member 119, such as a sleeve, or the like for instance, has one end thereof secured by suitable means, such as crimping or swedging or the like for instance, about sidewall 109 on hub portion 107 of end shield 67, and container 119 extends generally coaxially from the hub portion so that the opposite or free end of the container is disposed axially beyond thrust devices 135, 135a. Lubricant storage wicking material 117 may be formed of any suitable material, such as for instance an absorbent wool or "GE Lube" available from the General Electric Company, Fort Wayne, Ind. Storage wicking material 117 may be manually placed or injected into position within container 119 extending thereabout adjacent the free end of the container so as to be in lubricant transfer relation with face 131 of feeder wick 115.

Thrust devices or thrust collars 135, 135a may be formed of any suitable material, such as a ferrous material or the like for instance, and are provided with generally axial bores or openings 139, 139a therethrough intersecting with thrust bearing faces or surfaces 141, 141a thereon, respectively. Opening 139 in thrust collar 135 is gripped in engagement with a plurality of ridges 143 provided in shaft 75 so that thrust face 141 of thrust collar 135 is predeterminately located in bearing engagement with thrust taking surface 31 of bearing 21. If a more detailed explanation of thrust collar 135 and its engagement with shaft ridges 143 is desired, reference may be had to U.S. Pat. No. 4,215,287 issued July 29, 1980 to Charles W. Otto which is incorporated herein by reference. Opening 139a in thrust collar 135a is slidably arranged on shaft 75, and a coil spring 145 is biased between end face 87a of rotor 103 and thrust collar 135a urging thrust face 141a thereof into bearing engagement with thrust taking surface 31a of bearing 21a. If a more detailed discussion of coil spring 145 and its arrangement with shaft 75, rotor 103 and thrust device 135a is desired, reference may be had to the aforementioned Charles W. Otto application Ser. No. 377,678 filed May 12, 1982 (now abandoned) concurrently with this application. To complete the description of dynamoelectric machine 61, both thrust collars 135, 135a are disposed on rotatable assembly 65 so as to be conjointly rotatable therewith, and it may be noted that the compressive force of spring 145 not only urges thrust collars 135, 135a toward engagement with thrust taking surfaces 31, 31a of bearing 21, 21a but also accommodates or compensates for variance in end play of rotatable assembly 65 in dynamoelectric machine 61. While thrust collars 135, 135a and their securement with shaft 75 and rotor 103 are illustrated herein for purposes of disclosure, it is contemplated that other thrust collars secured in different manners may be utilized.

In the operation of dynamoelectric machine 61, assume that the component parts thereof are positioned as described hereinabove and as shown in FIG. 7. When dynamoelectric machine 61 is energized across a power source (not shown), winding means 93 of stator 85 is, of course, excited or energized, and since rotor 103 is arranged in magnetic coupling relation with the winding means, such energization of the dynamoelectric machine effects conjoint rotation of the rotor and shaft 75. The rotation of shaft 75 in bore 121 of bearing 21 effects a flow of lubricant from storage wicking material 117 in lubrication and bearing system 105 to feeder wick 115 which has its face 131 in abutment or lubricant transfer relation with the storage wicking material. From feeder wick 115, lubricant flows through wiping fingers 133, 133a to shaft 75 within bore 121 of bearing 21, and the lubrication of the shaft in the bearing bore is believed to be of the boundary type since the load of the shaft on the bearing bore is relatively light. Since some of capillary passages 29 in bearing 21 communicate or open into bore 121 thereof, lubricant within the bearing bore may escape or egress therefrom through the capillary passages in response to the bearing or journaling engagement of shaft 75 in the bearing bore; thus, it is believed that only boundary type lubrication is effected between the shaft and the bearing bore. Of course, lubricant may also be stored within capillary passages 29 of bearing 21 and/or flowed therethrough to all the surfaces of surface plurality 27 of bearing 21 with such flow being at least restricted to thrust taking surface 31, as discussed hereinafter.

Assuming that capillary passages 29 in bearing 21 intersecting with thrust taking surface 31 have been closed or so restricted to inhibit flow therethrough, as previously discussed, then it may be noted that the wiping engagement of feeder wick fingers 133, 133a with thrust face 141 of thrust collar 135 is effective to establish lubricant flow therebetween. Since lubricant can not escape through the closed or restricted capillary passages 29 intersecting with thrust taking surface 31 of bearing 21, the lubricant transferred from feeder wick fingers 133, 133a to thrust collar face 141 is effective to establish at least a partial hydrodynamic film of the lubricant between the bearing thrust taking surface and the thrust collar face. In this manner, the established hydrodynamic film of lubricant between bearing thrust taking surface 31 and thrust collar face 141 accommodates or lubricates the running or bearing engagement of thrust collar 135 on bearing 21 occasioned by end play movement of rotatable assembly 65 with respect to end shields 67, 67a of stationary assembly 63 upon the energization of dynamoelectric machine 61. Of course, lubricant flow through lubrication and bearing system 105a is effected in the same manner as described above to establish a hydrodynamic film of lubricant between thrust taking surface 31a of bearing 21a and face 141a of thrust collar 135a. As lubricant is passed from feeder wicks 115, 115a to thrust collars 135, 135a to maintain the established hydrodynamic film of the lubricant, some of the lubricant may be thrown or otherwise displaced by the rotating thrust collars generally radially outwardly thereof toward a part of storage wicking materials 117, 117a disposed generally coaxially about the thrust collars. In this manner, any lubricant so returned to storage wicking material 117, 117a may be recirculated or redistributed through lubrication and bearing systems 105, 105a in the same manner as discussed hereinabove.

While the above discussed operation of dynamoelectric machine 61 is based upon the establishment of a hydrodynamic film of lubricant between bearings 21, 21a and thrust collars 135, 135a, respectively, it is contemplated that a boundary or partial hydrodynamic type of lubrication may alternatively be established therebetween if the duty or application of the dynamoelectric machine will accommodate such alternative types of lubrication, as previously mentioned.

With reference again to the drawings in general and recapitulating with respect to the foregoing, there is illustrated a method of manufacturing or assembling dynamoelectric machine 61 (FIGS. 1-13). Dynamoelectric machine 61 comprises at least end shield 67, rotatable assembly 65 having thrust device 135 thereon, and bearing 21 (FIG. 7). Bearing 21 is formed of compressed powder material 25 and includes surface plurality 27 with the matrix of the compressed powder material defining capillary passages 29 for lubricant flow communicating with the surfaces thereof, respectively (FIG. 10). In this method, at least some of compressed powder material 25 on thrust taking surface 31 is mechanically worked with respect to at least some of capillary passages 29 communicating with the thrust taking surface, and thereby the at least some capillary passages are at least restricted so as to at least inhibit lubricant passage therethrough (FIGS. 1-6). Other surfaces, such as partial spherical bearing surface 77 and bore 121 on bearing 21 are associated in seating engagement with end shield 67 and in journaling engagement with shaft 75 of rotatable assembly 65, respectively, and thrust device 135 on the rotatable assembly is positioned at least adjacent thrust taking surface 31 of bearing 21 in thrust transferring relation therewith (FIG. 10).

With further reference to the drawings in general and with further recapitulation, there is also illustrated a method of fabricating bearing and lubrication system 105 in dynamoelectric machine 61 and operating the system upon energization of the dynamoelectric machine (FIGS 7.-13). System 105 comprises storage wicking material 117, feeder wick 115, bearing 21 and container 119 for the storage wicking material (FIG. 10). Bearing 21 is formed of compressed powder material 25 and includes surface plurality 27 with the compressed powder material defining capillary passages 29 adapted for lubricant flow communication with the surfaces (FIGS. 1-6). Dynamoelectric machine 61 also has end shield 67 and rotatable assembley 65 with thrust device 135 thereon (FIG. 7). In this method, at least some of compressed power material 25 at thrust taking surface 31 of bearing 21 is mechanically worked with respect to at least some of capillary passages 29 communicating with the thrust surface, and the at least some capillary passages are thereby at least restricted so as to at least inhibit lubricant flow therethrough (FIGS. 1-6). Bearing 21 and feeder wick 115 are assembled with wiping fingers 133, 133a extending into the bearing beyond bore 121 thereof and also from the bearing beyond thrust taking surface 31 thereof (FIGS. 7 and 10). In a compound arranging step of the method: partial spherical bearing surface 77 on bearing 21 is arranged in seating engagement on end shield 67; bore 121 of the bearing is arranged in journaling engagement with shaft 75 of rotatable assembly 65 and in wiping engagement with wiping fingers 133, 133a of feeder wick 115; thrust collar 135 on the rotatable assembly is arranged in thrust transfer relation with thrust taking surface 31 of the bearing and in wiping engagement with the wiping fingers of the feeder wick; and storage wicking material 117 in container 119 is arranged on end shield 67 in lubricant transfer relation with the feeder wick (FIG. 10). Lubricant flows from storage wicking material 117 through both feeder wick 115 and capillary passages 29 in bearing 21 into bore 121 thereof to effect lubrication of shaft 75 journaled therein, and lubricant also passes through wiping fingers 133, 133a of the feeder wick to thrust collar 135 to effect lubrication between the thrust collar and thrust taking surface 31 of bearing 21 at least when dynamoelectric machine 61 is energized (FIGS. 7 and 10).

From the foregoing, it is now apparent that a novel method of forming a bearing has been presented meeting the objects and advantageous features set out hereinbefore, as well as others, and that changes as to the precise arrangements, shapes, details and connections of the components utilized in such method, as well as the precise order of the method steps, may be made by those having ordinary skill in the art without departing from the spirit of the invention or the scope thereof, as set out in the claims which follow.

What I claim as new and desire to secure by Letters Patent of the United States is:

1. A method of forming a bearing having a body of at least sintered powder metal, the bearing body including a plurality of surfaces and with interstices in the sintered powder metal defining a plurality of capillary flow path means for lubricant flow extending through the bearing body and communicating with the surfaces thereof, respectively, and at least one of the surfaces being a generally annular planar surface having at least one depression therein with the at least one depression extending generally radially across the generally annular planar surface, using tool means having a face with a rib of a hardened material extending therefrom, the method comprising the steps of:
   placing the generally annular planar surface of the bearing body and the face of the tool means in juxtaposition and overlaying the rib of the tool means with a part of the generally annular planar surface;
   rotating at least one of the bearing body and the tool means and moving at least one of the tool means face and the generally annular planar surface toward the other thereof;
   rubbing the rib on the tool means face with the generally annular planar surface generally as the at least one of the bearing body and the tool means is rotated and entering the tool means rib into the at least one depression to effect the rubbing of at least a part of the at least one depression in the generally annular planar surface; and
   displacing at least some of the sintered powder metal on the generally annular planar surface and in the at least part of the at least one depression in response to the rubbing thereof with the rib of the tool means and at least reducing thereby the size of at least some of the capillary flow path means communicating with the generally annular planar surface and the at least part of the at least one depression therein.

2. The method as set forth in claim 1 wherein the rubbing and entering step includes advancing the tool means face toward the generally annular planar surface upon the entering of the tool means rib into the at least one depression.

3. The method as set forth in claim 1 wherein the displacing and at least reducing step includes depositing at least some of the displaced at least some sintered powder metal in the capillary path means communicating with the generally annular planar surface and closing thereby the capillary path means communicating with the generally annular planar surface.

4. The method as set forth in claim 1 comprising the additional step of reversing the rotation of the at least one of the generally annular planar surface and the tool means and thereafter further effecting the displacing and at least reducing step.

5. A method of forming a bearing having a body of sintered powder metal, the bearing body including a plurality of surfaces and with interstices in the sintered powder metal defining a plurality of capillary passages through the bearing body communicating with the surfaces thereof, respectively, one of the surfaces being a generally annular surface, at least one notch in the annular surface and extending generally radially across the annular surface, and a pair of beveled surfaces between the at least one notch and the annular surface and having a preselected depth, respectively, using a tool having a face with at least one rib of a hardened material extending therefrom a distance greater than the depth of the beveled surfaces, the method comprising the steps of:
   locating the annular surface and the face of the tool generally in spaced apart relation;
   rotating at least one of the tool and the annular surface;
   moving the at least one of the tool and the annular surface toward the other thereof and engaging the at least one rib of the tool with the annular surface;
   rubbing the at least one rib of the tool with the annular surface and the beveled surfaces generally as the at least one of the tool and the annular surface is rotated and moving the face of the tool toward the annular surface when the at least one rib of the tool is disposed at least in part in the at least one notch in the annular surface rubbing the beveled surfaces; and
   displacing at least some of the sintered powder metal on the annular surface and the beveled surfaces into at least some of the interstices of the sintered powder metal at least adjacent the annular surface and the beveled surfaces during the rubbing and moving step and at least restricting thereby at least some of the capillary passages in the bearing body communicating with the annular surface and the beveled surfaces.

6. The method as set forth in claim 5 wherein the rubbing and moving step includes translating the at least one rib of the tool across the at least one notch in the annular surface and disengaging the at least one rib of the tool from one of the beveled surfaces prior to the engagement of the at least one rib of the tool with the other of the beveled surfaces.

7. A method of forming a bearing having a body of sintered powder metal, the bearing body including a plurality of surfaces and with interstices in the sintered powder metal defining a plurality of capillary passages through the bearing body communicating with the surfaces thereof, respectively, one of the surfaces being a generally planar annular surface, at least one notch in the generally planar annular surface and extending generally radially thereacross, and a pair of spaced apart beveled surfaces on opposite sides of the at least one notch and interconnecting with the generally planar annular surface, respectively, using a tool having a face with at least one rib extending therefrom a distance greater than the preselected depth of the beveled surfaces, the method comprising the steps of:
   rotating at least one of the tool and the bearing body and moving at least one of the at least one rib on the tool and the generally planar annular surface toward the other thereof;

engaging the at least one rib of the tool with the generally planar annular surface in response to the rotating and moving step to effect rubbing of at least a part of the generally planar annular surface by the at least one rib of the tool during the rotation of the at least one of the tool and the bearing body;

entering the at least one rib of the tool at least in part into the at least one notch;

disengaging the at least one rib of the tool from the generally planar annular surface in response to the entering step and engaging the at least one rib of the tool with one of the beveled surfaces to effect the rubbing thereof by the at least one rib of the tool during the rotation of the at least one of the tool and the bearing body;

disengaging the at least one rib of the tool from the one beveled surface and translating the at least one rib of the tool across the at least one notch toward the other of the beveled surfaces during the rotation of the at least one of the tool and the bearing body;

abutting the at least one rib of the tool with the other beveled surface to effect the rubbing thereof by the at least one rib of the tool during the rotation of the at least one of the tool and the bearing body;

exiting the at least one rib of the tool from the at least one notch;

disengaging the at least one rib of the tool from the other beveled surface in response to the exiting step and reengaging the at least one rib of the tool with the generally planar annular surface to effect further rubbing thereof by the at least one rib of the tool during the rotation of the at least one of the tool and the bearing body; and deforming at least some of the sintered powder metal on the generally planar annular surface and the beveled surfaces into at least some of the interstices of the sintered powder metal at least adjacent the generally planar annular surface and the beveled surfaces upon the rubbing thereof by the at least one rib of the tool and at least restricting thereby at least some of the capillary passages in the bearing body communicating with the generally planar annular surface and the beveled surfaces, respectively.

8. The method as set forth in claim 7 wherein the entering step includes advancing the face of the tool in a direction toward the generally planar annular surface.

9. The method as set forth in claim 7 wherein the exiting step includes retracting the face of the tool in a direction away from the generally planar annular surface.

10. The method as set forth in claim 7 comprising the preliminary step of locating the face of the tool and the generally planar annular surface generally in spaced apart relation.

* * * * *